United States Patent [19]

Alamgir et al.

[11] Patent Number: 5,252,413
[45] Date of Patent: Oct. 12, 1993

[54] SOLID POLYMER ELECTROLYTE LITHIUM BATTERIES

[75] Inventors: Mohamed Alamgir, Dedham; Kuzhikalail M. Abraham, Needham, both of Mass.

[73] Assignee: EIC Laboratories, Inc., Norwood, Mass.

[21] Appl. No.: 864,723

[22] Filed: Apr. 7, 1992

[51] Int. Cl.$^5$ .............................................. H01M 8/12
[52] U.S. Cl. ..................... 429/192; 429/191; 429/252; 429/254
[58] Field of Search ............... 429/192, 194, 191, 254, 429/252

[56] References Cited

U.S. PATENT DOCUMENTS

| | | | |
|---|---|---|---|
| 4,197,364 | 4/1980 | Vecchiotti | 429/254 |
| 4,303,748 | 12/1981 | Armand | 429/192 |
| 4,740,433 | 4/1988 | Lu | 429/254 |
| 4,830,939 | 5/1989 | Lee et al. | 429/192 |
| 4,980,250 | 12/1990 | Takahashi et al. | 429/194 |

FOREIGN PATENT DOCUMENTS 0279554  8/1988  European Pat. Off.

OTHER PUBLICATIONS

M. Watanabe et al., Makromol. Chem., Rapid Commun. 2, 741 (1981).
K. M. Abraham et al., J. Electrochem. Soc., 137, 1657 (1990).

Primary Examiner—Prince Willis, Jr.
Assistant Examiner—M. Nuzzolillo

[57] ABSTRACT

This invention pertains to Lithium batteries using Li ion (Li+) conductive solid polymer electrolytes composed of solvates of Li salts immobilized in a solid organic polymer matrix. In particular, this invention relates to Li batteries using solid polymer electrolytes derived by immobilizing solvates formed between a Li salt and an aprotic organic solvent (or mixture of such solvents) in poly(vinyl chloride).

21 Claims, 3 Drawing Sheets

SOLID POLYMER ELECTROLYTE LITHIUM BATTERIES

FIELD OF INVENTION

This invention was made with Government support under Contract DE-FG01-90ER81078 awarded by the United States Department of Energy. The Government has certain rights in this invention.

BACKGROUND OF THE INVENTION

Alkali metal ion conductive polymer electrolytes are of considerable interest for use in high energy density batteries, sensors and electrochromic devices. Conventional polymer electrolytes consist of complexes of Li salts with organic polymers having an electron donor atom such as O or N. The most prominent example of conventional polymer electrolytes are the complexes of alkali metal salts, particularly Li salts, with poly(ethylene oxide), (PEO). PEO-based electrolytes have very low conductivities of the order of $10^{-8}$ ohm$^{-1}$·cm$^{-1}$ at room temperature so that they are not practical for normal temperature applications. Therefore, rechargeable Li batteries utilizing PEO-based electrolytes are operated at about 100° C. where the electrolytes attain a practical conductivity of about $10^{-3}$ ohm$^{-1}$·cm$^{-1}$. Conductivities of this magnitude are exhibited at room temperature by nonaqueous liquid electrolytes and are required for the fabrication of electrochemical devices suitable for moderate to high rate applications.

According to the prevailing theory, ionic conduction in polymer electrolytes is facilitated by the large-scale segmental motion of the polymer backbone and primarily occurs in the amorphous regions of the polymer electrolyte. Crystallinity restricts polymer backbone segmental motion and significantly reduces conductivity. Consequently, polymer electrolytes with high conductivity at room temperature have been sought through polymers which have highly flexible backbones and have largely amorphous morphology. Li salt complexes of polymers such as poly[bis-(methoxyethoxyethoxy)phosphazene (reported by Blonsky et al., J. Am. Chem. Soc., 106, 6854 (1984) and poly(ethoxyethoxy-ethoxy-vinyl ether) (described by Pantaloni et al., Electrochim. Acta, 34, 635 (1989), prepared on the basis of these principles, have shown room temperature conductivities of around $10^{-5}$ ohm$^{-1}$·cm$^{-1}$.

We have discovered that polymer electrolytes having conductivities greater than $10^{-4}$ ohm$^{-1}$·cm$^{-1}$ at room temperature can be obtained by immobilizing complexes of a low lattice energy Li salt such as LiClO$_4$, LiBF$_4$, LiAsF$_6$ or LiCF$_3$SO$_3$ and a high dielectric constant aprotic organic solvent(s) or mixtures of solvents such as propylene carbonate and ethylene carbonate in poly(vinyl chloride) (PVC). In this manner, ionic conductivity typical of liquid electrolytes can be obtained in a solid polymer electrolyte. This approach of preparing highly conductive solid polymer electrolytes has been successfully demonstrated with the development of electrolytes with conductivities of $\sim 2\times 10^{-3}$ ohm$^{-1}$·cm$^{-1}$ at room temperature. Using these electrolytes we have fabricated and cycled rechargeable Li and batteries at room temperature. This invention is the subject of this patent application.

SUMMARY OF THE INVENTION

An object of this invention is to provide new solid polymeric electrolytes for use in high energy density rechargeable batteries.

A further object of this invention is to provide solid polymeric electrolytes which have conductivities characteristics of non-aqueous liquid electrolytes of greater than $10^{-3}$ ohm$^{-1}$·cm$^{-1}$ at room temperature. These and other objects of this invention are accomplished by providing solid polymer electrolytes composed of Li salt or other alkali or alkaline earth metal salt solvates of organic solvents, immobilized in the polymer poly(vinyl chloride), abbreviated PVC. Such highly conductive electrolytes allow the operation of rechargeable Li batteries at room temperature.

A typical solid electrolyte comprises 80 weight-percent (w/o) of an aprotic organic solvent propylene carbonate (PC) containing 5 w/o LiClO$_4$ immobilized in 15 w/o PVC. It has conductivities of $0.9\times 10^{-3}$ ohm$^{-1}$·cm$^{-1}$ at 20° C.

DETAILED DESCRIPTION OF THE INVENTION

Figure 1:
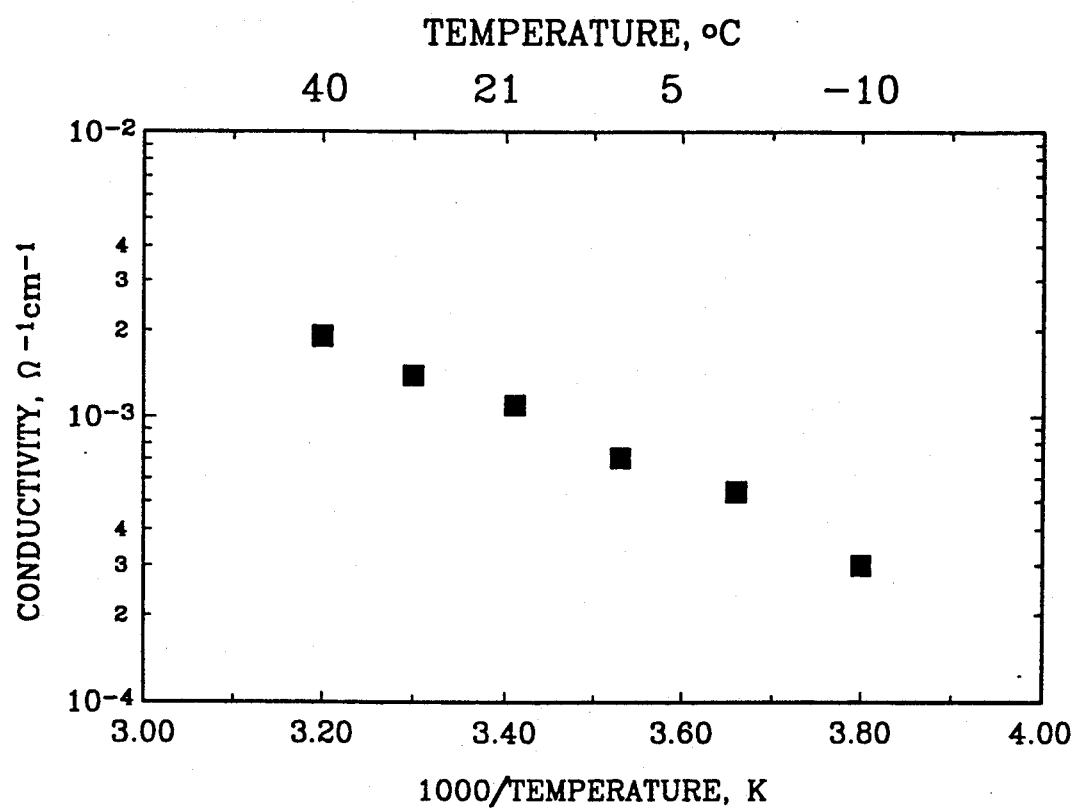
FIG. 1 depicts the conductivities of an electrolyte film prepared using poly(vinyl chloride) as the polymer matrix. The conductivities are presented for a series of temperatures between $-10°$ C. and 40° C.

Solid polymer electrolytes which conduct alkali metal ions such as Li$^+$ and Na$^+$ are of importance for the fabrication of solid-state devices such as primary and secondary Li batteries and electrochromic windows. The rate at which these solid-state devices can be operated, depends, to a large extent, on the conductivity of the polymer electrolyte. A goal of researchers in the field has been Li$^+$-conductive solid polymer electrolytes exhibiting conductivities of the order of $10^{-3}$ ohm$^{-1}$·cm$^{-1}$ at 20° C. (i.e., room temperature), a value typical of many liquid electrolytes. With such high conductivity in solid polymer electrolytes, solid-state Li batteries and electrochromic devices with rate capabilities characteristic of their liquid electrolyte counterparts can become feasible. In prior research, we prepared polymer electrolytes with conductivities of about $2\times 10^{-3}$ ohm$^{-1}$·cm$^{-1}$ at 20° C. by immobilizing Li salt solvates of organic solvents in a polyacrylonitrile matrix (K. M. Abraham and M. Alamgir, J. Electrochem. Soc., Vol. 137, 1657, (1990)). It was found that the nature of the polymer network is of crucial importance in obtaining a solid polymer electrolyte with both good mechanical strength and high conductivity. North (EP 0279554) added a mixture of ethylene carbonate and propylene carbonate to (PEO)$_n$·LiClO$_4$ complex to increase the conductivity of the latter electrolyte. Similarly, Lee et al. (U.S. Pat. No. 4,830,939) prepared polymeric electrolyte by adding propylene carbonate to poly(ethylene glycol)di- or methacrylate and radiation curing the latter to form a network polymer. It is clear that the desirability of a solid polymer electrolyte for battery applications is primarily determined by the properties of the polymer network.

We have discovered that dimensionally stable, free-standing solid polymer electrolyte films with conductivities of greater than $10^{-3}$ ohm$^{-1}$·cm$^{-1}$ at room temperature can be obtained by plasticizing poly(vinyl chloride) (PVC) with solvates formed between a Li salt such as LiClO$_4$ or LiN(CF$_3$SO$_2$)$_2$ and an organic solvent such as propylene carbonate, ethylene carbonate etc., or mixtures thereof. Earlier attempts to prepare solid electrolytes using PVC by Watanabe et al. (Makromol. Chem., Rapid Commun., 2, 741, 1981) were unsuccessful. These authors tried to prepare such electrolytes by dissolving PVC in propylene carbonate or ethylene carbonate at 120° C. However, they failed to prepare any homogeneous electrolyte films. We have discovered that the key to preparing homogeneous solid electrolyte films based on PVC is to first dissolve PVC and PC in a common, low boiling solvent such as tetrahydrofuran and then evaporate the solvent off at room temperature. This results in homogeneous solid electrolyte film.

The polymer network preferred for forming the electrolytes of this invention is poly(vinyl chloride), which has the following structure

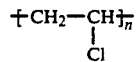

Copolymers of PVC and poly(vinyl acetate) (PVA) can also be used. PVC/PVA with 10% PVA is an example of such a polymer.

Li salts and solvents suitable for preparing the electrolytes of this invention are preferably selected on the basis of the same principles used for selecting these components for highly conductive liquid electrolytes. These requirements include: 1) Li salts having large anions and low lattice energies such as LiClO$_4$, LiAsF$_6$, LiBF$_4$, LiCF$_3$SO$_3$, LiPF$_6$ and LiN(CF$_3$SO$_2$)$_2$, 2) organic solvents with high dielectric constants to promote the dissociation of the low lattice energy Li salts, thereby forming highly conductive electrolytic medium; 3) organic solvents having electron donor atoms such as O and N through which the solvents can form complexes (or solvates) with the Li ions of the Li salt. These requirements are realized with Li salts such as LiClO$_4$ exhibiting a lattice energy of 723 kilo-Joules (kJ)/mole, and organic solvents such as PC and EC with dielectric constants of 64.4 and 89.6, respectively.

In addition to ethylene carbonate and propylene carbonate, organic solvents preferred for preparing solid polymer electrolytes of the present invention are dimethyl sulfoxide (DMSO), tetramethylene sulfone (sulfolane), γ-butyrolactone, N-methyl Pyrrolidinone (NMP) and tri- and tetraethylene glycol dimethyl ether (tri- and tetraglymes). These solvents have high boiling points, which augment the preparation of electrolyte films with good dimensional stability. Dimensional stability is defined as the ability of the electrolyte to be isolated as free-standing films.

The method of preparation of these solid polymer electrolytes can be illustrated is as follows. PVC, LiClO$_4$ and PC were dissolved in THF and stirred well till a homogeneous solution was obtained. The solution was then poured onto a TEFLON from Dupont dish. On evaporating off the THF at room temperature, thin electrolyte films were formed.

The amounts of Li salt, solvent(s) and PVC in the polymer electrolyte is critical. For example, the composition having 10 weight-percent (w/o) PVC, 15 w/o LiClO$_4$ and 75 w/o PC did not form a homogeneous film. On the other hand, homogeneous films could be prepared from the composition 15 w/o PVC, 5 w/o LiClO$_4$ and 80 w/o PC. For high conductivity and good mechanical properties, the electrolyte should preferably contain between 50 and 90 weight-percent of the solvent(s), between 5 and 30 weight-percent of PVC and between 5 and 15 weight-percent of the Li salt.

For a high energy density ambient temperature battery embodying this invention, the negative electrode material preferably consists of lithium. For certain other battery applications it may consist of a lithium alloy or amalgam. If a lithium alloy is used, it preferably is a lithium-tin, lithium-lead, lithium-zinc, lithium-aluminum or lithium-magnesium alloy having at least 50%, more preferably at least 65% lithium by weight.

Further, the electrolytes of this invention are suitable for use in conjunction with Li insertion anodes such as graphitic carbon, Li$_x$TiS$_2$ or Li$_x$WO$_2$. The graphitic carbon will be that derived from graphite, petroleum coke, benzene or other carbonaceous materials.

Also, electrolytes made in accordance with this invention may be used in cells where the anode is a material other than lithium, e.g., potassium, sodium, magnesium, calcium or zinc, or a mixture thereof with or without lithium. Furthermore, while the invention is most advantageous in providing high energy density primary, and secondary cells, the electrolyte may be formulated so as to provide stable low or medium energy density cells.

For a high energy density ambient temperature battery, the positive electrode material preferably consists of metal or mixed metal oxides or metal chalcogenides. The metal oxides include V$_6$O$_{13}$, V$_2$O$_5$, MnO$_2$, LiCoO$_2$, LiNiO$_2$, Li$_x$Mn$_y$O$_z$, LiM$_{1-y}$M'$_y$O$_z$, while metal chalcogenides include TiS$_2$, FeS$_2$. Other positive electrode materials that may be used are lithium polysulfide (Li$_2$S$_n$) and organic compounds such as polypyrrole, polythiophene, polyacetylene.

The following examples further illustrate the present invention.

EXAMPLE 1

A mixture of PVC, PC and LiClO$_4$ in the amounts shown in Table 1 was dissolved in 10 ml THF. The homogeneous solution was then poured onto a TEFLON from DuPont dish. On evaporating off THF at room temperature, a clear free-standing electrolyte film was formed. Its conductivity was determined by the AC impedance method and was found to be $0.8 \times 10^{-3}$ ohm$^{-1}$·cm$^{-1}$ at 20° C.

TABLE 1

| TYPICAL COMPOSITION OF A PVC—PC—LiClO$_4$ POLYMER ELECTROLYTE | | |
|---|---|---|
| | Composition, (g) | Composition, (wt %) |
| PVC | 0.15 | 15 |
| PC | 0.80 | 80 |
| LiClO$_4$ | 0.05 | 5 |

EXAMPLE 2

A mixture of PVC, PC and LiClO$_4$ in the amounts shown in Table 2 was dissolved in 10 ml THF. The homogeneous solution was then poured onto a TEF- LON from DuPont dish. On evaporating off THF at room temperature, a nonhomogeneous material with different phases was left behind. It could not be isolated as a single-phase film.

TABLE 2

COMPOSITION OF A PVC—PC—LiClO$_4$ POLYMER ELECTROLYTE THAT CANNOT BE CAST AS A HOMOGENEOUS FILM

|  | Composition (g) | Composition, (wt %) |
|---|---|---|
| PVC | 0.10 | 10 |
| PC | 0.80 | 80 |
| LiClO$_4$ | 0.10 | 10 |

EXAMPLE 3

A mixture of PVC, EC+PC and LiClO$_4$ in the amounts shown in Table 3 was dissolved in 10 THF. The homogeneous solution was then poured onto a TEFLON from DuPont dish. On evaporating off THF at room temperature, a translucent mechanically stable electrolyte film was formed. Its conductivity was determined to be $1.4 \times 10^{-3}$ ohm$^{-1}$·cm$^{-1}$ at 20° C.

TABLE 3

TYPICAL COMPOSITION OF A PVC—EC + PC—LiClO$_4$ POLYMER ELECTROLYTE

|  | Composition (g) | Composition, (wt %) |
|---|---|---|
| PVC | 0.15 | 15 |
| PC | 0.40 | 40 |
| EC | 0.40 | 40 |
| LiClO$_4$ | 0.05 | 5 |

EXAMPLE 4

A mixture of PVC, PC and LiN(CF$_3$SO$_2$)$_2$ in the amounts shown in Table 4 was dissolved in THF. The homogeneous solution was then poured onto a TEFLON from DuPont dish. On evaporating off THF at room temperature, an almost clear dimensionally stable electrolyte film was formed. Its conductivity was determined to be $1.1 \times 10^{-3}$ ohm$^{-1}$·cm$^{-1}$ at 20° C.

TABLE 4

TYPICAL COMPOSITION OF A PVC—PC—LiN(CF$_3$SO$_2$)$_2$ POLYMER ELECTROLYTE

|  | Composition (g) | Composition, (wt %) |
|---|---|---|
| PVC | 0.15 | 15 |
| PC | 0.80 | 80 |
| LiN(CF$_3$SO$_2$)$_2$ | 0.05 | 5 |

EXAMPLE 5

Figure 2:
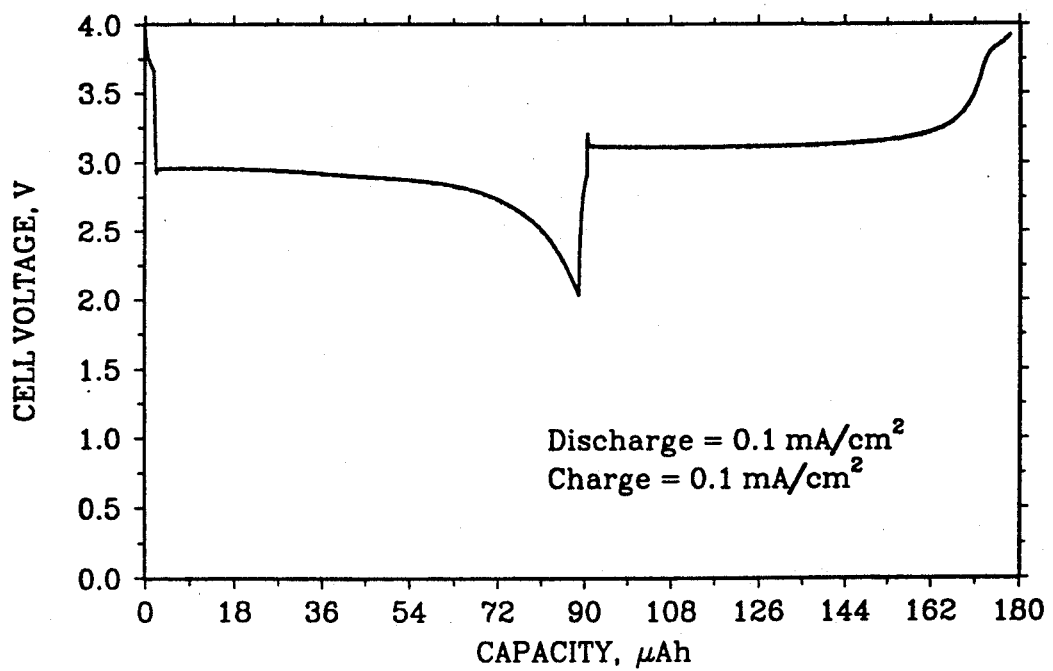
FIG. 2 depicts the room temperature discharge curves for a Li/LiMn$_2$O$_4$ solid-state cell utilizing a solid polymer electrolyte of this invention.

A Li/LiMn$_2$O$_4$ rechargeable solid-state cell was prepared by sandwiching electrolyte from example 1 (having a thickness of 5 mil) between a Li foil (1 mil thick) and a LiMn$_2$O$_4$ cathode (5 mil thick, prepared from a 50:50 weight percent mixture of electrolyte from example 1 and LiMn$_2$O$_4$ on a Ni foil). The cell was discharged and charged at 20° C. at current a density of 0.1 mA/cm$^2$ between 3.9 and 2.0 V. The cell exhibited a mid-discharge voltage of 2.9 V. The results are graphically presented in FIG. 2.

EXAMPLE 6

Figure 3:
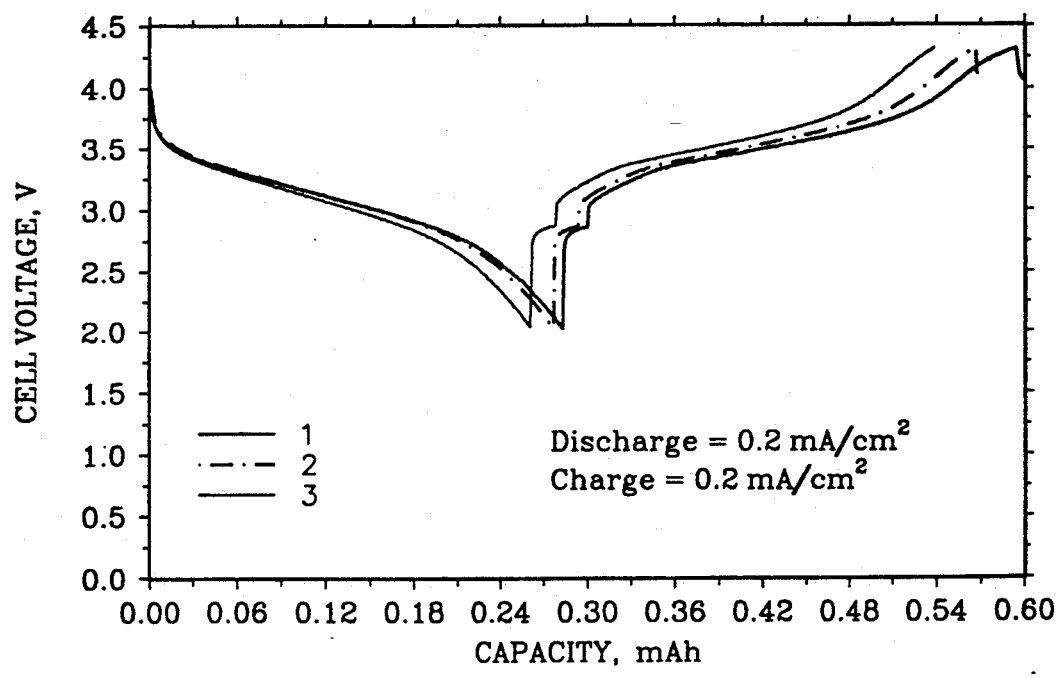
FIG. 3 depicts the room temperature discharge curves for a carbon/LiMn$_2$O$_4$ solid-state cell utilizing a solid polymer electrolyte of this invention.

A carbon/LiMn$_2$O$_4$ rechargeable solid-state cell was prepared by sandwiching electrolyte of Example 1 (having a thickness of 5 mil) between a carbon anode (3 mil thick) and a LiMn$_2$O$_4$ cathode, prepared in the same way as in Example 5. The carbon anode was prepared by pasting a 50:50 mixture of petroleum coke and the electrolyte from Example 1 onto a Ni shim. The cell was discharged and charged at 20° C. at a current density of 0.2 mA/cm$^2$ between 4.2 and 2.0 V. The cell showed a mid-discharge voltage of 3.0 V. The results are graphically presented in FIG. 3.

What is claimed is:

1. A solid electrolyte comprising:
   a polymer network comprising poly(vinyl chloride);
   a solvate consisting of an alkali metal salt dissolved within one or more aprotic organic solvents; and
   a low boiling solvent capable of evaporating off of the polymer/solvate mixture at about room temperature.

2. The solid electrolyte of claim 1, wherein said alkali metal salt is a low lattice energy lithium salt.

3. The solid electrolyte of claim 2, wherein said low lattice energy lithium salt is selected from the group consisting of LiClO$_4$, LiBF$_4$, LiAsF$_6$, LiCF$_3$SO$_3$, LiPF$_6$, and LiN(CF$_3$SO$_2$).

4. The solid electrolyte of claim 1, wherein said electrolyte contains between 5 and 15 weight-percent of said alkali metal salt.

5. The solid electrolyte of claim 1, wherein said polymer network further comprises a mixture of poly(vinyl chloride) and poly(vinyl acetate).

6. The solid electrolyte of claim 1, wherein said aprotic organic solvent is selected from a group consisting of propylene carbonate, ethylene carbonate, dimethyl sulfoxide, tetramethylene sulfone (sulfolane), gamma-butyrolactone, N-methyl-2-pyrrolidinone, and tri-and tetra-ethylene glycol dimethyl ether.

7. The solid electrolyte of claim 1, wherein said electrolyte contains between 50 and 90 weight-percent of said aprotic organic solvent.

8. The solid electrolyte of claim 1, wherein said electrolyte contains between 5 and 30 weight percent of said polymer network.

9. The solid electrolyte of claim 1, wherein said low boiling solvent is tetrahydrofuran.

10. A rechargeable electrochemical cell comprising:
    an alkali metal containing anode;
    a cathode; and
    solid electrolyte containing a polymer network comprising poly(vinyl chloride); a solvate consisting of an alkali metal salt dissolved within one or more aprotic organic solvents; and a low boiling solvent capable of evaporating off of the polymer/solvate mixture at about room temperature.

11. The rechargeable cell of claim 10, wherein said alkali metal containing anode is lithium.

12. The rechargeable cell of claim 10, wherein said alkali metal containing anode is a lithium alloy.

13. The rechargeable cell of claim 12, wherein said lithium alloy is selected from the group consisting of lithium-aluminum, lithium-tin, lithium-lead, lithium-zinc, and lithium-magnesium.

14. The rechargeable cell of claim 10, wherein said alkali metal containing anode is a lithium containing compound.

15. The rechargeable cell of claim 14, wherein said lithium containing compound is graphitic carbon.

16. The rechargeable cell of claim 14, wherein said lithium containing compound is a lithium-transition metal oxide.

17. The rechargeable cell of claim 14, wherein said lithium containing compound is a lithium-transition metal sulfide.

18. The rechargeable cell of claim 14, wherein said cathode is a metal or a mixed metal oxide.

19. The rechargeable cell of claim 14, wherein said cathode is a metal chalcogenide.

20. The rechargeable cell of claim 14, wherein said cathode is selected from the group consisting of $TiS_2$, $FeS_2$, $V_6O_{13}$, $LiNiO_2$, $V_2O_5$, $LiCoO_2$, $MnO_2$, $Li_xM-n_yO_z$, and $LiM_{1-y}M'_yO_2$, where M and M' are transition metals.

21. A method for preparing solid electrolytes comprising:
   combining a polymer network comprising poly(vinyl chloride), with a solvate consisting of an alkali metal salt dissolved within one or more aprotic organic solvents, and a low boiling solvent; and
   evaporating off the low boiling solvent at about room temperature.

* * * * *